United States Patent [19]

Takatoo et al.

[11] Patent Number: 5,095,365
[45] Date of Patent: Mar. 10, 1992

[54] SYSTEM FOR MONITORING OPERATING STATE OF DEVICES ACCORDING TO THEIR DEGREE OF IMPORTANCE

[75] Inventors: Masao Takatoo, Katsuta; Chieko Onuma, Ibaraki; Junzo Kawakami, Mito; Masayuki Fukai, Hitachi; Tadaaki Kitamura, Hitachi; Seiitsu Nigawara, Hitachi, all of Japan

[73] Assignee: Hitachi, Ltd., Tokyo, Japan

[21] Appl. No.: 599,096

[22] Filed: Oct. 17, 1990

[30] Foreign Application Priority Data

Oct. 20, 1989 [JP] Japan .................. 1-271676
Oct. 20, 1989 [JP] Japan .................. 1-271686

[51] Int. Cl.⁵ ............................................. H04N 7/18
[52] U.S. Cl. ..................... 358/108; 358/100; 358/222
[58] Field of Search .............. 358/108, 125, 126, 100, 358/105, 222

[56] References Cited

U.S. PATENT DOCUMENTS

| | | | |
|---|---|---|---|
| 3,840,699 | 10/1974 | Bowerman | 358/125 |
| 4,612,575 | 9/1986 | Ishman et al. | 358/105 X |
| 4,653,109 | 3/1987 | Lemelson et al. | 382/34 |
| 4,737,847 | 4/1988 | Araki et al. | 358/108 |
| 4,739,401 | 4/1988 | Sacks et al. | 358/126 |
| 4,908,704 | 3/1990 | Fujioka et al. | 358/108 |

FOREIGN PATENT DOCUMENTS

| | | |
|---|---|---|
| 58-51679 | 3/1983 | Japan . |
| 60-93589 | 5/1985 | Japan . |
| 6130192 | 2/1986 | Japan . |
| 61-116489 | 6/1986 | Japan . |
| 62-86990 | 4/1987 | Japan . |
| 2-205998 | 8/1990 | Japan . |

Primary Examiner—Victor R. Kostak
Attorney, Agent, or Firm—Antonelli, Terry, Stout & Kraus

[57] ABSTRACT

An abnormality monitoring system comprises controller for changing monitoring frequency according to the operating state of devices to be monitored and the degree of monitoring importance and controller for correcting an inputted monitor picture by computing a positional shift of the monitor picture to a reference picture using a mark position of the monitor picture and a mark position of the reference picture, wherein, when abnormality is detected, the contents of the abnormality and the contents of processing against the abnormality are displayed as a guidance.

21 Claims, 16 Drawing Sheets

FIG. 2

| SCENE NUMBER | DANGER LEVEL |
|---|---|
| 1 | 70 |
| 2 | 90 |
| 3 | 20 |
| 4 | 80 |
| 5 | 10 |
| 6 | 50 |
| 7 | 30 |
| 8 | 60 |
| ⌇ | ⌇ |
| n | 40 |

A WATER LEAKAGE OCCURRED AROUND A VALVE A. CONFIRM THE SITUATION ON THE TV MONITOR AND CONTACT THE MAINTENANCE/REPAIR DEPARTMENT. WHEN CONTINUOUS OPERATION IS REQUIRED. OPEN THE BYPASS VALVE OF THE VALVE A.

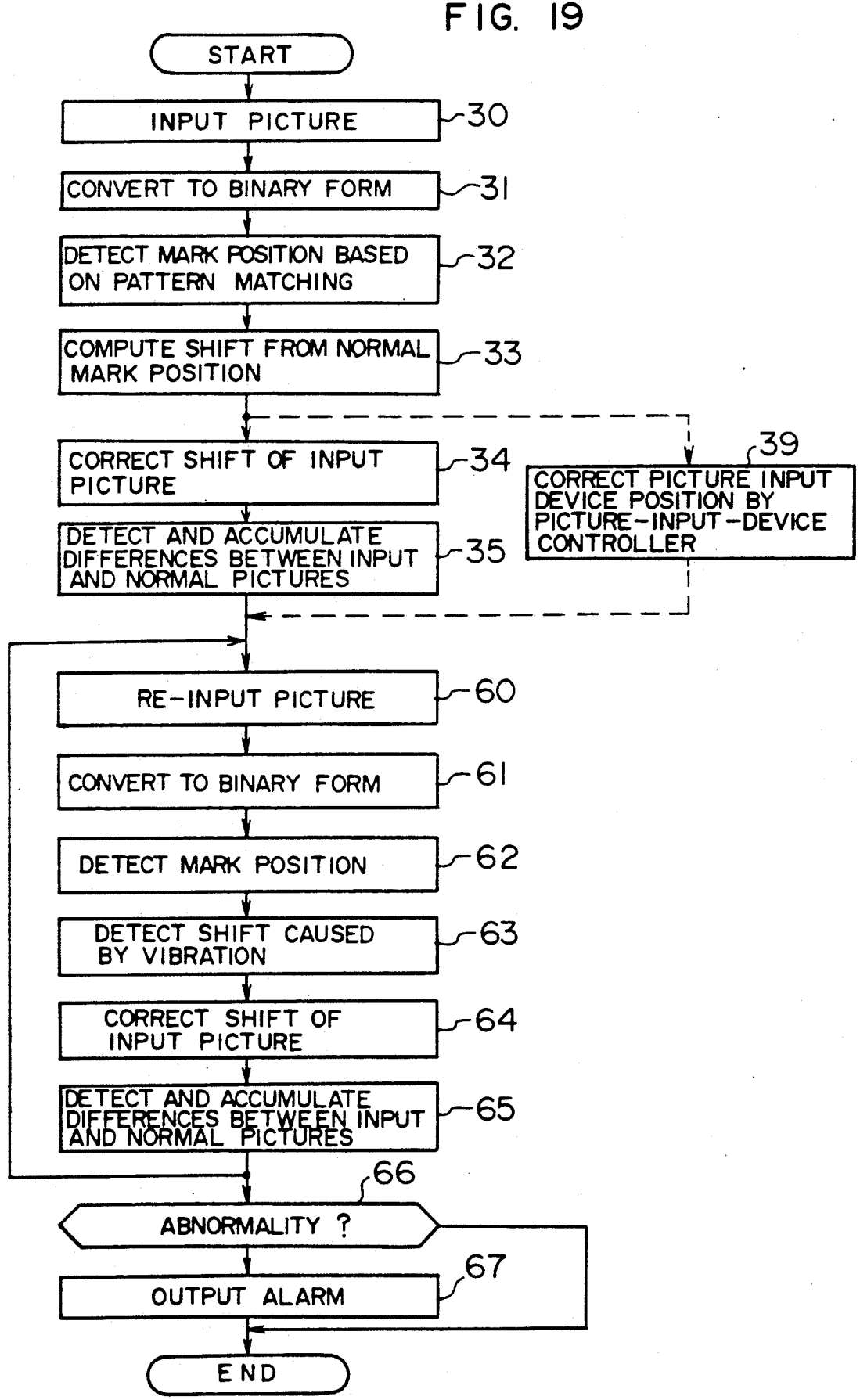

SYSTEM FOR MONITORING OPERATING STATE OF DEVICES ACCORDING TO THEIR DEGREE OF IMPORTANCE

BACKGROUND OF THE INVENTION

The present invention generally relates to abnormality monitoring system which monitors the state of a plant with use of an industrial television camera or cameras (ITV cameras).

Techniques related to the present invention are disclosed in the following published Japanese applications:

(1) JP-A-6304396

An ITV camera, picture processing means and memory means for previously storing a normal picture representing a normal state are used to monitor an abnormality in a plant.

(2) JP-A-61-30192

For the purpose of monitoring a moving crane, transported packages. etc, a mark is applied as a target to a moving object or a relatively moving object, and the moving object is traced to discriminate and judge the movement pattern or size of the moving object.

(3) JP-A-58-51679

When detecting an abnormality, the contents of the abnormality are displayed in the form of a picture, message and so on.

(4) JP-A-60-93589

When one ITV camera becomes faulty, operation is switched from the faulty camera to another normal ITV camera.

(5) JP-A-61-116489

An abnormality is detected on the basis of projection distributions in x- and y-directions of a display screen.

(6) JP-A-62086990

When detecting an abnormality, informs the operator indicates the occurrence of the abnormality by issuing an alarm sound from a loudspeaker or by blinking a lamp.

These related techniques, however, have inherent problems in that no consideration is given to the influence of a camera positioning error caused by a single ITV camera monitoring a plurality of locations or to a relative positional shift between the camera and the object to be monitored caused by the vibration of a plant to be monitored or by the vibration of the camera. In this regard, a shift between an input monitor picture zone in a monitor state and a normal monitor picture zone (previously set picture zone) in a normal state prevents correct detection of an abnormality.

Further, since different monitoring priorities (monitoring importances) are not provided to objects to be monitored, the monitoring efficiency becomes low.

In addition, even when an abnormality is detected, only such means as will inform the operator of the occurrence of the abnormality in the form of an alarm sound or simple message is provided and no device is provided to allow even a beginner to take countermeasures against the abnormality.

Furthermore, since not two but only one is provided for each of the processing devices of the abnormality monitoring system, the overall monitoring system is insufficient with respect to safety and security against the occurrence of a fault in the system itself, that is, the reliability in the detection of the abnormality is low.

SUMMARY OF THE INVENTION

It is a first object of the present invention to correct or remove any influence from a shift between an input picture zone and a normal picture zone in a normal state caused by a camera positioning error to rightly judge the occurrence of an abnormality.

A second object of the present invention is to more frequently monitor objects which are required to be monitored preferentially and to less frequently monitor objects which are not regarded as so important, thus realizing a good monitoring efficiency.

A third object of the present invention is to present the operator with such alarm contents that he can immediately take proper countermeasures against the occurrence of an abnormality.

A fourth object of the present invention is to provide an abnormality monitoring system which has a double monitoring function of, even when a part in the system becomes faulty, being able to continuously and normally monitor zones to be monitored.

In accordance with the present invention, the first object is attained by applying special marks (such as #, Δ, etc.) for positional shift correction onto an object to be monitored or a surface in the vicinity thereof, detecting a shift between an input picture zone and a normal picture zone on the basis of the marks, applying an affine transformation (movement, enlargement, reduction, rotation) to the input picture to move it by an amount corresponding to the shift or feeding the shift back to a camera controller to move the camera and to cause the input picture zone to coincide with the normal picture zone, and then correctly judging the presence or absence of an abnormality.

When a special mark which is easy to detect is applied to the object to be monitored or in the vicinity thereof, a mark position in the normal picture and the corresponding position in the input picture can be easily and accurately computed by pattern matching using the detection mark as a reference pattern and by picture processing means for calculating the center of gravity of the mark. As a result, the shift between the normal and input picture zones can be accurately corrected.

In accordance with the present invention, the second object is attained by judging through a device operational state monitor the stopped, operating or starting state of devices to be monitored and in the case of the stopped state, by removing the stopped-state device from the devices to be monitored to thereby omit unnecessary processing.

Further, different danger levels indicative of the degree of monitoring importance are applied to the respective scenes monitored by the ITV camera and displayed on a display unit so that the scenes having larger danger levels are more frequently monitored.

The third object is attained, when abnormality is judged, by informing the operator of the occurrence of the abnormality and of the corresponding countermeasures against the abnormality in the form of a detailed message. As a result, even when the operator is a beginner, he can quickly cope with any abnormality.

The fourth object is attained by providing respectively two monitoring devices, i.e., two picture input devices, picture input controllers, picture processors, picture input device controllers. Then, display units, and when a fault detector of the monitoring system detects a fault in one of the two monitor devices, by lighting up or blinking a lamp corresponding to the faulty monitor device the operator is informed of the presence of the faulty monitor device and operation is switched from the faulty monitor device to the other normal one. As a result, since the monitoring operation is continuously carried out, the abnormality monitoring system can be remarkably improved in reliability.

BRIEF DESCRIPTION OF THE DRAWINGS

FIG. 2 is a table to be used when pictures are selected through a picture input controller;

FIG. 19 is a flowchart for explaining how to correct a positional shift caused by the vibration of an object to be monitored and a camera.

DESCRIPTION OF THE PREFERRED EMBODIMENT

Figure 1:
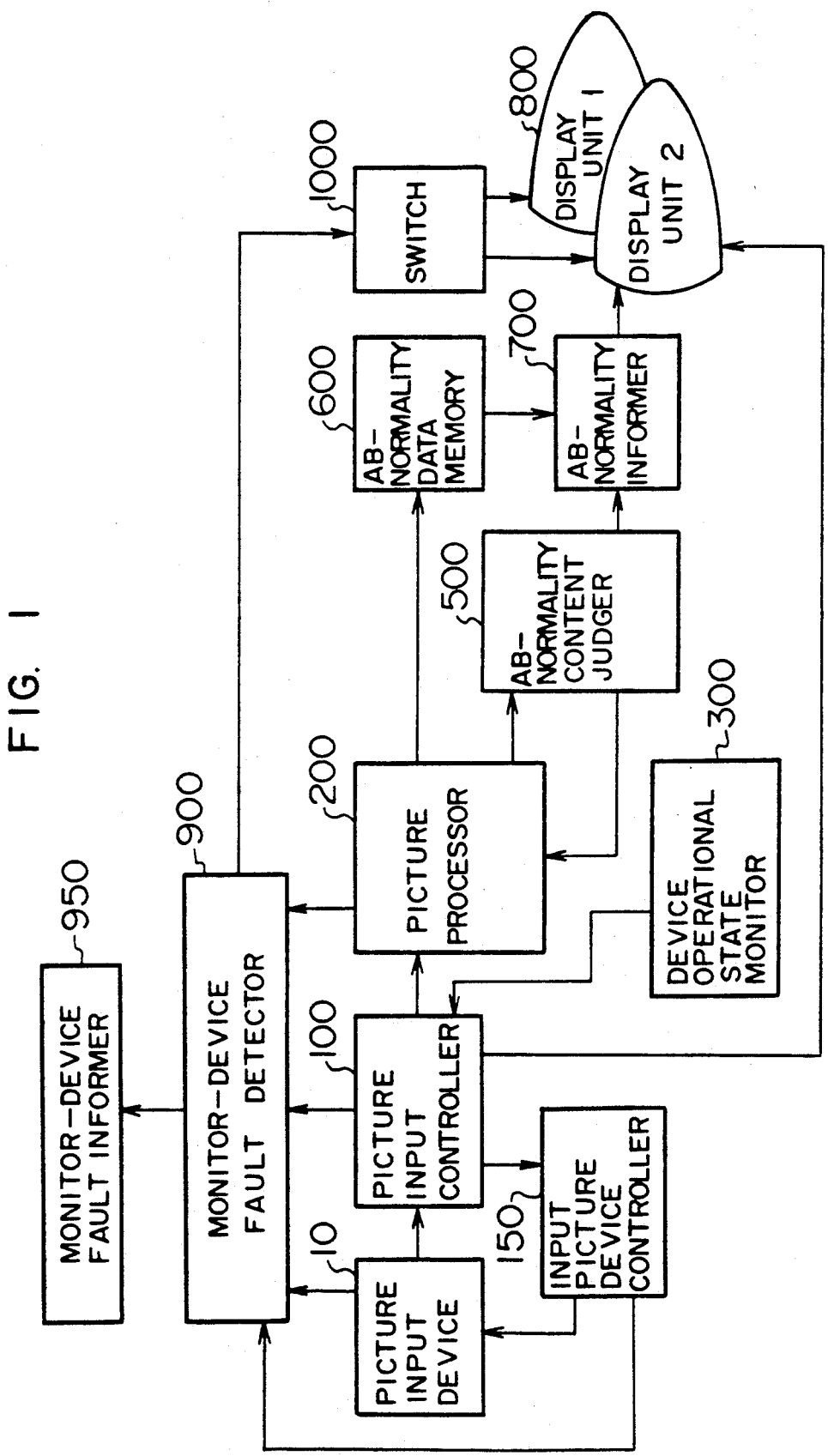
FIG. 1 is a block diagram of an abnormality monitoring system in accordance with an embodiment of the present invention.
Figure 12:
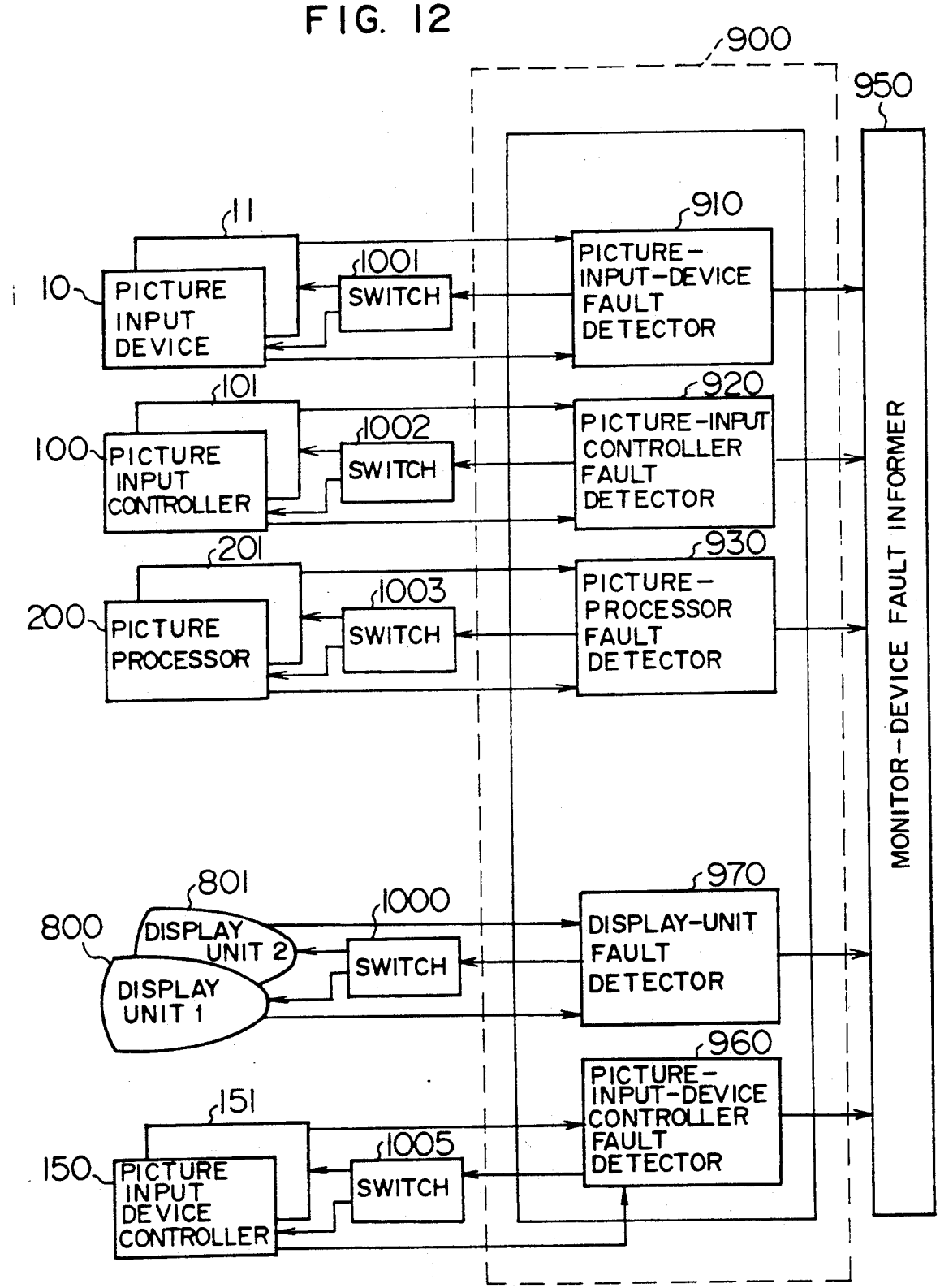
FIG. 12 is a block diagram of an interior of a monitor-device fault detector.

An embodiment of the present invention will be described with reference to the attached drawings. Referring first to FIG. 1, there is shown a block diagram of an abnormality monitoring system in accordance with an embodiment of the present invention. In the present embodiment, a picture input device 10 consists of n ITV cameras or n monitoring cameras which pick up the images of x zones (scenes) to be monitored and output a picture signal. A picture input controller 100 receives the picture signal from the picture input device 10 and selects one of the n zone (scene) pictures to be processed and applies the selected picture to picture processor 200 for its processing. The picture processor 200 sets as a reference picture the scene first received from the picture input controller 100 at the time of starting a sampling for each monitor scene and thereafter performs m sampling operations over the same monitor scene to input the monitor picture, corrects a positional deviation between the reference picture and the inputted picture, and accumulates differences in picture element brightness between the reference and sampled pictures. Items of a device to be monitored, however, vary depending on whether the device is out of its operational state or in its operational state, as a matter of course. Thus, a device operational state monitor 300 is provided for judging the state of the device, that is, the state out of operational state or operating state such as the fully opened, fully closed or intermediate state and for supplying a signal corresponding to each state to a picture input controller 100. The picture input controller 100 in turn, when receiving the state indicative signal from the device operational state monitor 300, determines the execution or non-execution of abnormality diagnosis and restricts the monitor items and the monitor zones to eliminate unnecessary monitoring operations to improve monitoring efficiency. The picture processor 200 corrects for any deviation between the reference picture in the normal state and the input picture in the monitor state and compares both pictures to detect an abnormality. Abnormality contents judger 500 judges the contents of an abnormality using an accumulation signal of the subtracted pictures received from the picture processor 200. The abnormality content judger 500, when judging the presence of an abnormality, acts to cause the picture data being stored in the picture processor 200 to be stored into an abnormality data memory 600, and at the same time, to cause an abnormality informer 700 to activate such display units 800 as indicator lamps or monitors, informing the watchman of the abnormality. When the watchman notices the abnormality by the abnormal indication provided by the display units 800 provided on a central monitor panel through the abnormality informer 700, he depresses one of a plurality of select buttons of the central monitor panel corresponding to the abnormal picture to transmit an abnormality signal to the picture input controller 100. And the picture input controller 100, when receiving the abnormality signal, selects the corresponding picture. The picture input controller 100 switches to the picture input device 10 receiving the picture of the abnormal device. Since the abnormal scene is displayed on the display unit 800, the watchman can observe the abnormal device in detail. A monitor fault detector 900 is used for monitoring whether or not the picture input device 10, picture input controller 100, picture processor 200, picture input device controller 150 and display units 800 are normally operating. The monitor fault detector 900, when detecting a fault in one of these monitor devices, causes a monitor fault informer 950 to change the color of one of indicator lamps corresponding to the faulty monitor device as provided on the central monitor panel from blue to red, for example, or to blink a red indicator lamp or to sound an alarm, thereby informing the watchman of the fault in the monitor device. With respect to the fault of the display units 800, since the display units are doubly provided, when there occurs a fault in one of the display units, a switch 1000 functions to change over operation from the faulty display unit to the other normal one. The switching operation of the monitor devices other than the display device as a preliminary function is shown in FIG. 12.

FIG. 2 shows a table 118 which is provided in the picture input controller 100 to select the monitor pictures from the x monitor zones (scenes). The picture input device 10 comprising n ITV cameras can receive the picture of a device in any of the x monitor scenes and output corresponding picture signals, but cannot process the picture signals of two or more of the scenes at the same time, in other words, can process only one picture at a time. For selecting one of the monitor pictures, in accordance with the present invention, one of scene numbers 120 is allocated to each of the scenes so that, when it is desired to sequentially select the monitor pictures, numbers 1, 2 and 3 for example are allocated to the monitor pictures as the scene numbers 120. When it is desired to randomly select the monitor pictures, the respective scene numbers 120 are determined by the generation of a random number upon the scene numbers. With respect to danger levels 140 of the table 118, on the other hand, the larger the danger level is the more preferentially the corresponding scene is monitored. The danger level 140 can be externally changed by the watchman and a signal from the device operating state monitor 300.

Figure 3:
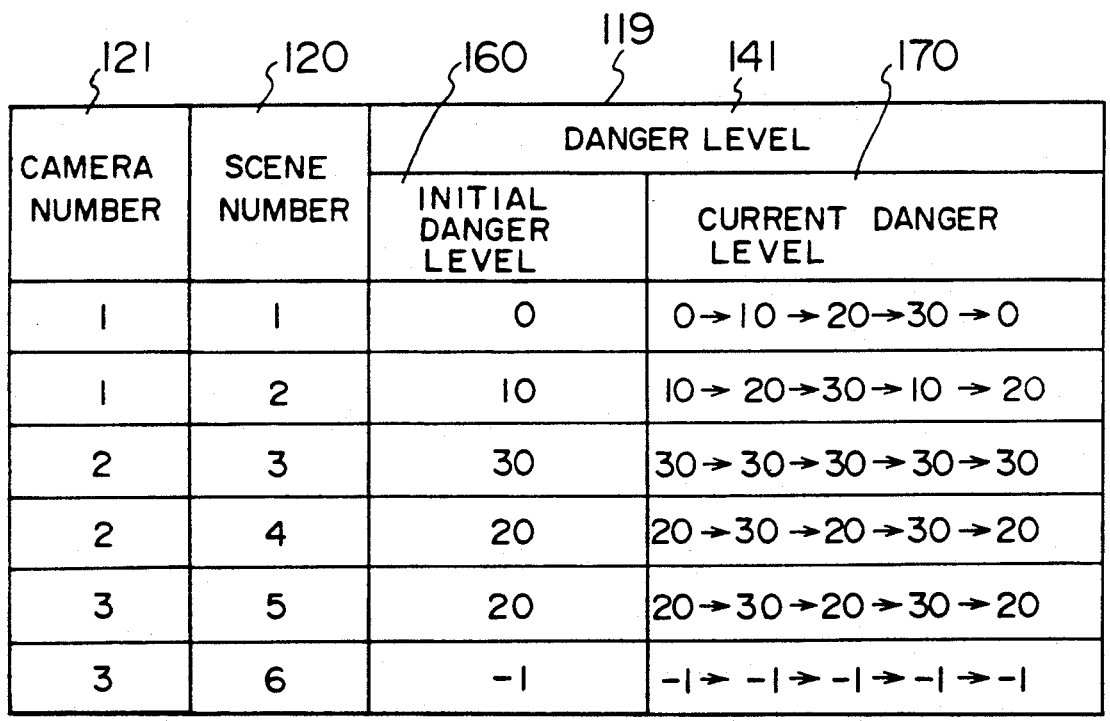
FIG. 3 is a table to be used when pictures are selected through the picture input controller based on danger levels.

Monitor zones having higher danger degrees of an abnormality occurrence or monitor zones having less possibility of abnormality occurrence but having much higher danger degrees at the time of abnormality occurrence are required to be set to a higher monitoring frequency than the other monitor zones. This can be realized, for example, by preparing a table 119 having danger levels 141 as shown in FIG. 3. In this case, an initial danger level 160 is set as the initial value of a danger level with respect to each of the scene numbers corresponding to the scenes. When a check is sequentially made for the scene numbers 1 to 6, this means to check whether to satisfy a relation "current danger level (denoted by 170 in the table 119)≧threshold (for example, 30)". When the current danger level is 30 or higher, the picture of the associated scene number is selected and also the current danger level is replaced by the initial danger level. When the current danger level is smaller than 30, on the other hand, the associated picture is not selected and the current danger level 170 is updated to "the current danger level +10" and thereafter control goes to the next scene number to check the current danger level 170 of the associated scene. The initial danger level and threshold are previously set by the operator. In the example of FIG. 3, the third scene is selected every time, the fourth and fifth scenes are selected every second time, the second scene is selected every third time, and the first scene is selected every fourth time.

When the scene is selected as above mentioned, the picture input controller 100 retrieves a camera number in the column of camera number 121 in the table 119. The camera number corresponds to the camera which provides the selected scene. When the camera number is detected, instructions for setting the camera at a predetermined position or angle are inputted to the picture input device controller 150 from the picture input controller 100, whereby the corresponding camera (or picture input device 10) is selected among a plurality of cameras and the picture from the selected camera is transmitted to the picture processor 200.

When the initial danger level is set to be negative, the corresponding current danger level is also set to have the same negative value as the initial one and the corresponding picture is set so as not to be inputted as a monitor picture. Accordingly, when a device to be monitored is out of its operational state, the corresponding initial danger level is set to be negative. The initial danger level 160 is set by a signal sent from the device operating state monitor 300 or manually.

Figure 4:
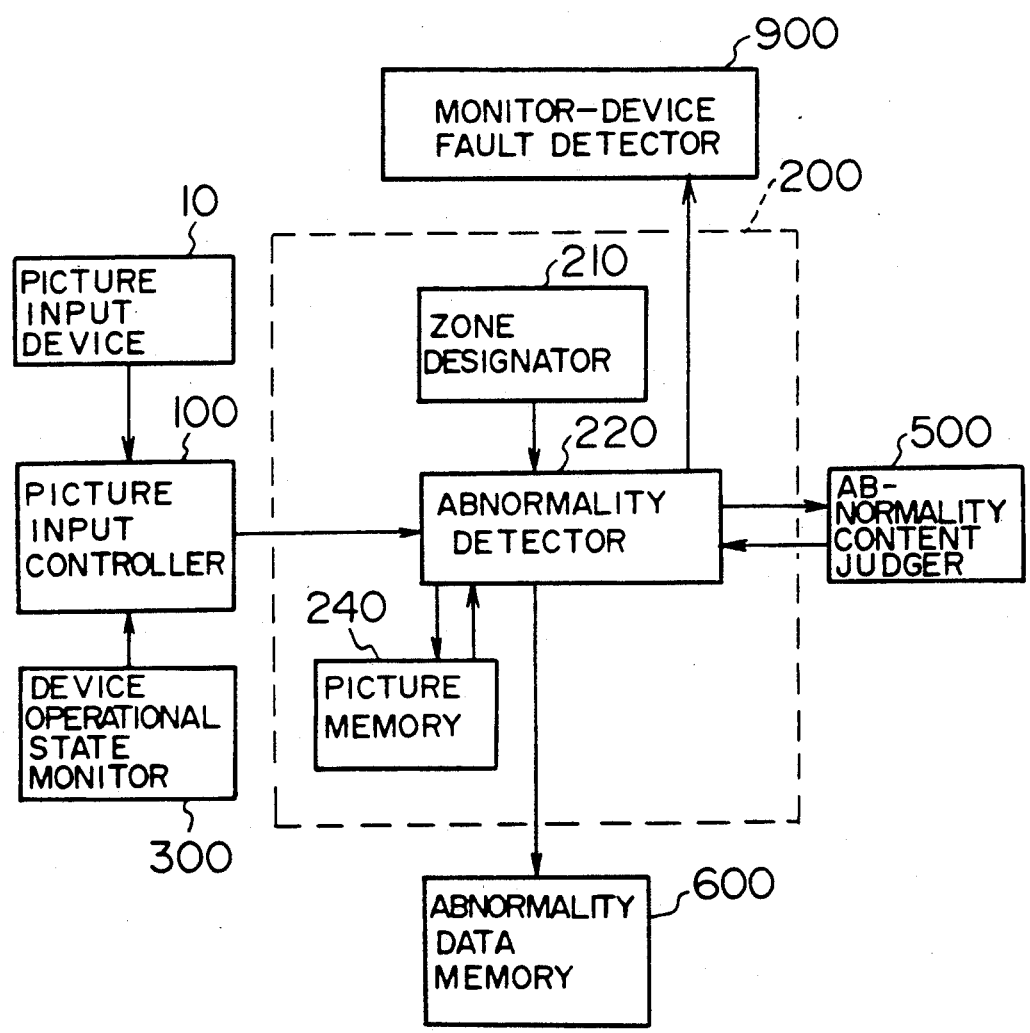
FIG. 4 is a block diagram of a picture processor showing its interior.

FIG. 4 is a block diagram showing the interior of the picture processor 200. There are two types of abnormalities in the single picture selected at the picture input controller 100, that is, one necessary to monitor the entire picture to detect an abnormality such as a vapor leakage, the other required to monitor only a restricted area of the picture to detect an abnormality such as a water or oil leakage. In the latter case of monitoring the restricted area of the picture, the designation of the restricted area is required. This designation is carried out at an area designator, and more specifically, by the operator designating an area of the picture to be monitored while looking at the monitor picture indicated on the screen of the display unit with use of a mouse. In this connection, the number of areas to be designated with the mouse may be one or more. When a plurality of monitor areas are designated at the area designator 210, monitoring priorities are attached to the plurality of areas. The priorities are determined on the basis of the estimation of the contents of an abnormality occurrence in the monitor areas. For example, the highest priority is applied to the lower area of a monitor object where the possibility of occurrence of a water or oil leakage is high. When the monitor area is determined at the area designator 210, abnormality detector 220 calculates differences in picture element brightness between the reference picture stored in a picture storage memory 240 and the monitor picture inputted from the picture input device 10, and accumulates the difference to detect the abnormality. The abnormality detector 220 temporarily stores the reference and monitor pictures in the picture storage memory 240 for processing. When the presence of an abnormality is determined at the abnormality content judger 500, the corresponding picture and the abnormality contents such as an area of the abnormal part are stored and kept in the abnormality data memory 600. The abnormality data may be stored on an optical disk, an optical-magnetic disk, a video tape recorder or any device, which can be connected to the picture processor 200 to store the above picture and abnormality contents.

With respect to the restricted area for monitoring, the related art is mentioned in Japanese patent application No. 1-25807 field on Feb. 6, 1989.

Figure 5:
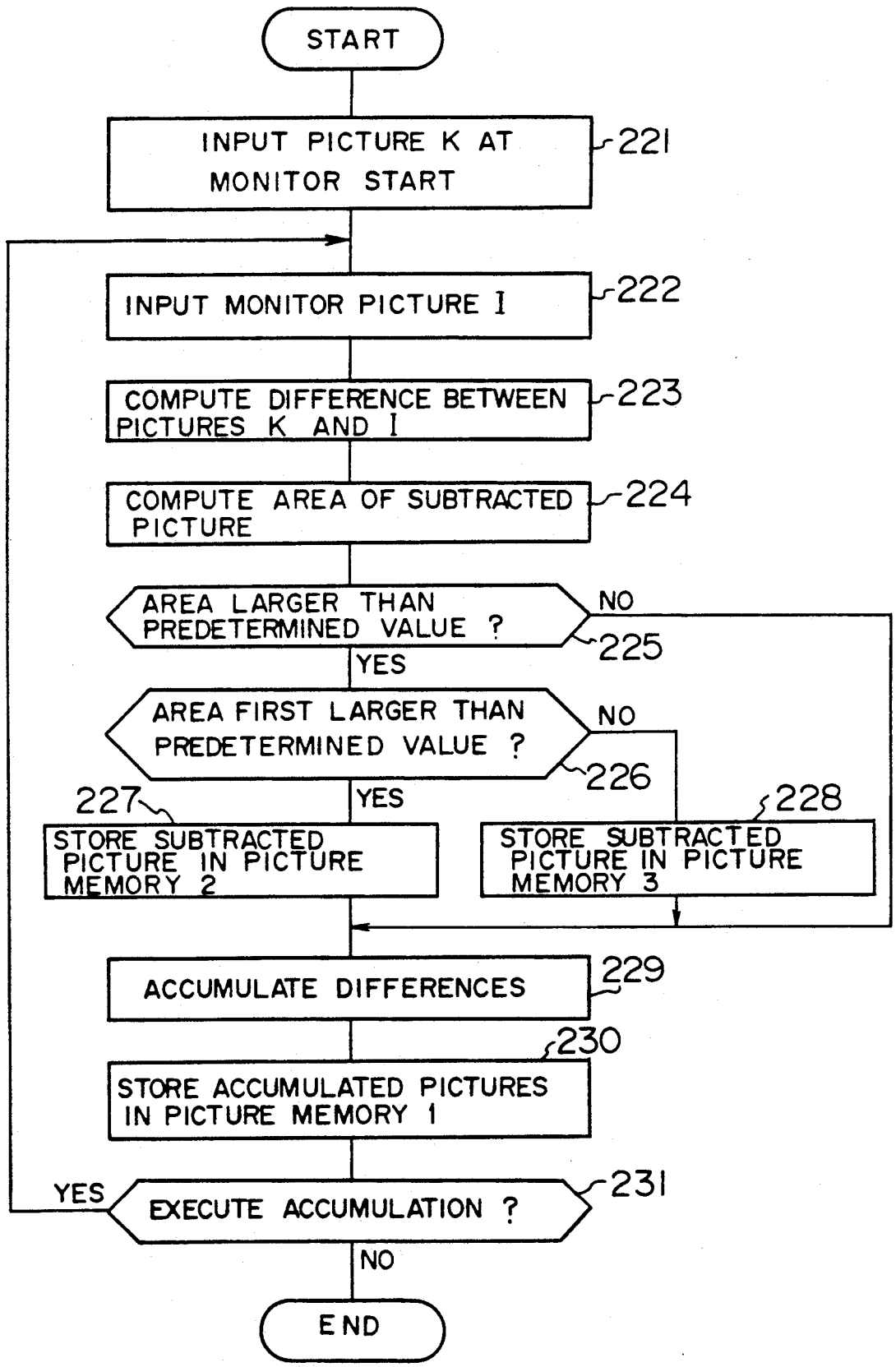
FIG. 5 is a flowchart showing the operations of an abnormality detector for detecting the presence or absence of abnormality.

Shown in FIG. 5 is a procedure of the abnormality detector 220 for detecting the presence or absence of an abnormality in the restricted monitor area designated at the area designator 210. In the procedure performed by the abnormality detector 220, more specifically, a picture first sampled and inputted at the time of starting the monitoring operation is set as a reference picture k in a step 221, a picture i to be monitored is sampled and inputted during monitoring of the same scene for a predetermined time in a step 222, differences in picture element brightness between the reference picture k and the monitor picture i are calculated in a step 223, an area of the subtracted picture is computed in a step 224, and it is judged in a step 225 whether or not the subtracted picture area is not less than a predetermined value (which may be any value so long as it can allow discrimination between noise and abnormality). When the subtracted picture area is determined in the step 225 to be not less than the predetermined value, that is, when an abnormality takes place, it is judged in a step 226 whether or not it is the first occurrence in the current monitoring cycle in which the subtracted picture area is not less than the predetermined value. If it is the first occurrence, then the corresponding subtracted picture is stored into a memory 2 of the picture memory 240 in a step 227. The subtracted picture judged first as an abnormality is stored in the memory 2. When the judgement in the step 226 is not the first occurrence in the current monitoring cycle, the corresponding subtracted picture is stored in a memory 3 of the picture memory 240 in a step 228. While the picture is judged to be abnormal, the picture data of the memory 3 is sequentially updated and the last picture judged abnormal remains.

If the area of the subtracted picture not accumulated is less than the predetermined value in the step 225, then control proceeds to a step 229. The differences are accumulated in the step 229 and the accumulated subtracted picture is stored in a memory 1 of the picture memory 240. That is, the accumulation result of the differences is stored in the memory 1. It is judged in a step 231 whether or not the accumulation has been carried out a predetermined number of times. When the accumulation is still required to be continued, control goes back to the step 222, whereas, if no additional accumulation is required then the processing is terminated. The subtracted picture is stored in the memories 2 and 3 of the picture memory 240 in the steps 227 and 228 for the purpose of judging whether the abnormality contents refer to vapor or a moving object or water or oil. In summary, the picture inputted in the step 221 is set as a reference picture, differences in picture element brightness between the monitor picture inputted in the step 222 and the reference picture are accumulated for a predetermined time in the steps 223 to 231, and on the basis of the accumulation result, the abnormal part can be detected. Abnormality judgement is carried out by converting the accumulated subtracted picture into binary data, adding together the areas of the dots varying in brightness and determining whether or not the total number performed by such dots exceeds a predetermined value, which will be detailed later in connection with FIG. 7.

Figure 6:
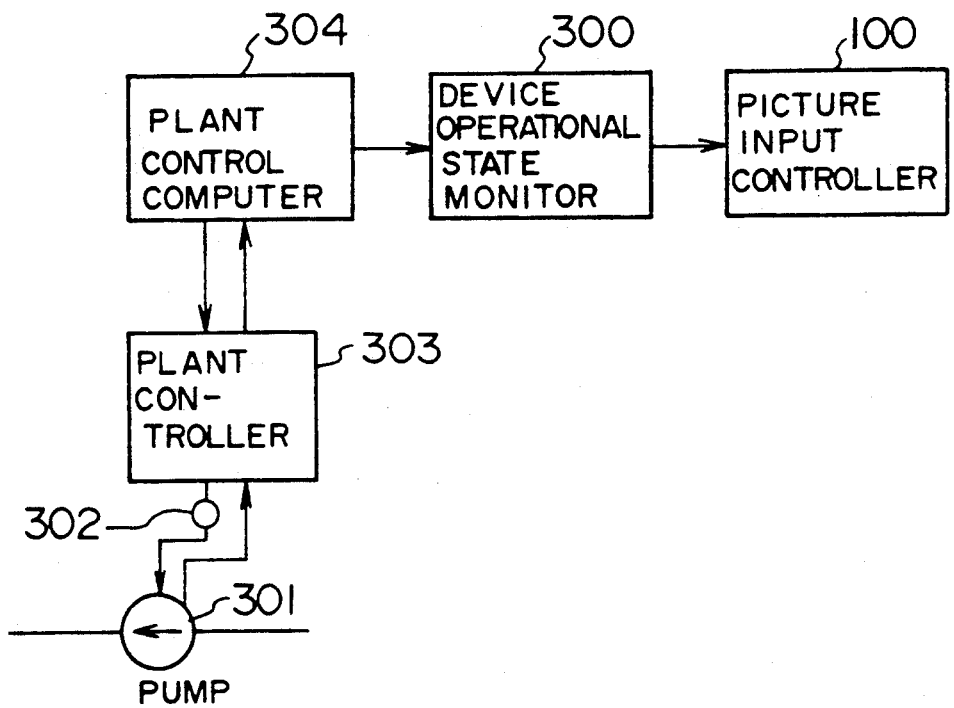
FIG. 6 is a block diagram for explaining how to detect data indicative of an operational state of a pump.

FIG. 6 is a block diagram when which shows an example of when the operational state of a pump 301 as a device is to be monitored in the device operational state monitor 300. The operational state of the pump 301 based on control data received from a start/stop controller 302 is inputted, in an RS-232C communication format, to a plant control computer 304 through a plant controller 303. The control data includes data indicative of the out of operational state, start state, operating state, fully opened state, intermediate valve-opening state and fully closed state of the pump 301.

The device operational state monitor 300 judges the operational state of the pump on the basis of control data received from the plant control computer 304 and transmits the corresponding data to the picture input controller 100.

Figure 7:
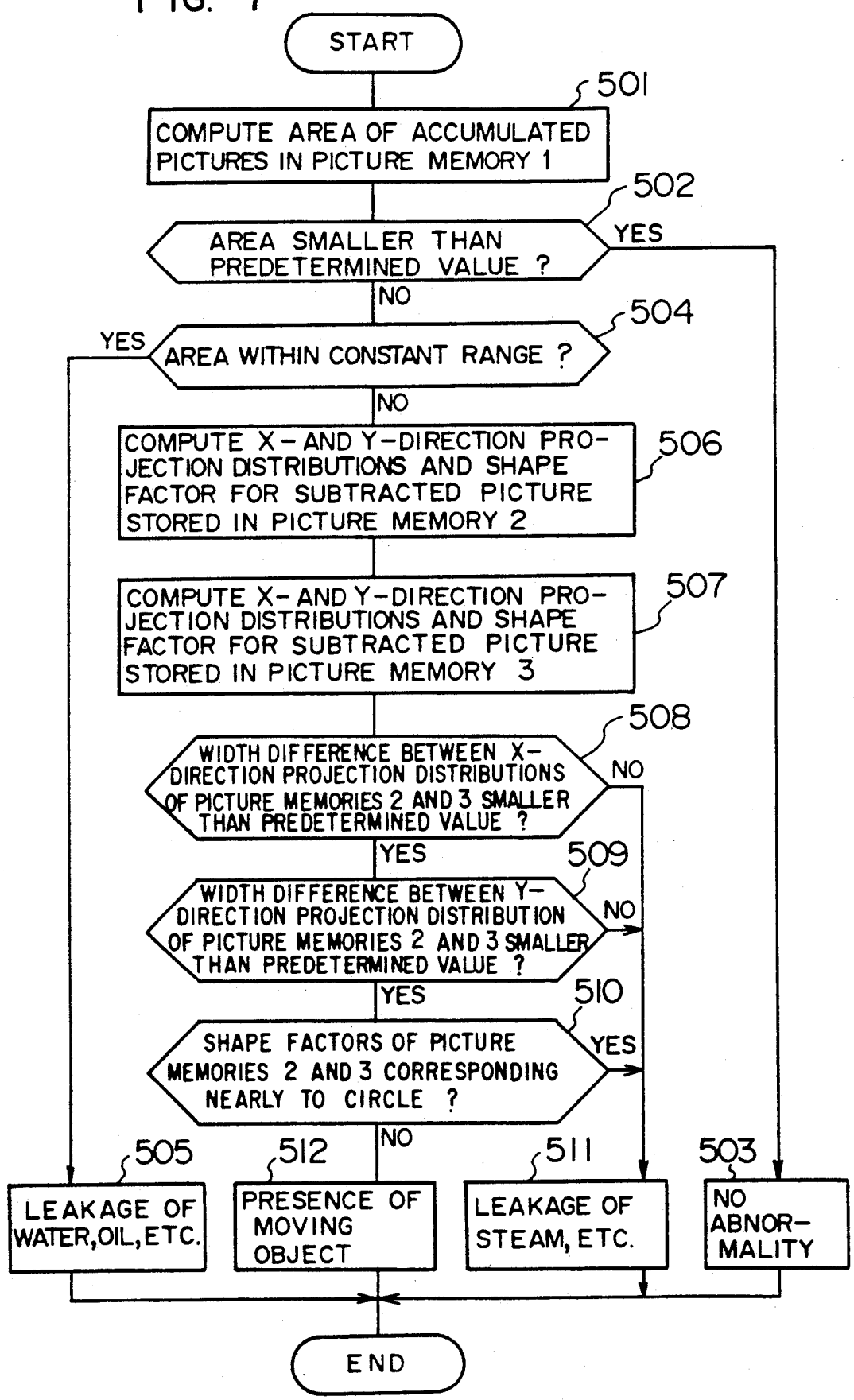
FIG. 7 is a flowchart showing a procedure for judging the presence or absence of an abnormality.

Referring to FIG. 7, there is shown a procedure of the abnormality content judger 500 for judging the presence or absence of an abnormality and the abnormality contents. In the procedure of FIG. 7, more in detail, an area of the accumulated subtracted picture of the abnormal part stored in the picture memory 1 is computed in a step 501, and when the area of the accumulated subtracted picture is less than a predetermined value in a step 502, it is judged in a step 503 that there is no abnormality. The above predetermined value is determined by the type of an estimated abnormality. For example, the predetermined value is set to be 1000 picture elements for vapor and 30 picture elements for water or oil. When the area of the accumulated subtracted picture is determined in the step 502 to be not less than the predetermined value, it is judged in a step 504 whether or not the area is within a predetermined range. If the area is within the predetermined range, then it is determined in a step 505 that there is a relatively small leakage such as a water or oil leakage. When the area is determined in the step 504 to be out of the predetermined range, control proceeds to a step 506 where the subtracted picture, which is first detected to be abnormal in the certain monitoring time and is stored in the picture memory 2 in the step 227, is computed with respect to its x-direction and y-direction projection distributions and shape factor. The projection distribution refers to accumulative addition of brightness of each picture element or dot higher in brightness than a predetermined level in the x- or y-direction. The shape factor refers to a degree of circle expressed in terms of an area and its perimeter. The shape factor is 1 for a circle. Even in a step 507, the subtracted picture, which is last detected to be abnormal in the certain monitoring time and is stored in the picture memory 3 in the step 228, is computed with respect to the x-direction and y-direction projection distributions and shape factor of the differential picture. In a step 508, a difference in width between the x-direction projection distributions is computed in the steps 506 and 507 and it is judged whether or not the width difference is less than a predetermined value. In a step 509, a difference in width between the y-direction projection distributions is computed in the steps 506 and 507 and it is judged whether or not the width difference is less than a predetermined value. In a step 510, it is judged, on the basis of the shape factors of the picture memories 2 and 3, whether or not the shape factors refer substantially to a circle. When the width difference between the x-direction projection distributions computed in the step 508 is not less than the predetermined value, it means that the width difference between the width of the first abnormal part and the width of the last abnormal part is larger. In this case, it is considered that an abnormality is the reason for such an object that is changing in shape and thus it is determined in a step 511 that there is a vapor leakage. Similarly, when the width difference between the y-direction projection distributions computed in the step 509 is not less than the predetermined value, it means that width difference between the width of the first abnormal part and the width of the last abnormal part is larger. In this case, it is determined in a step 511 that there is a vapor leakage. When the width difference between the x-direction projection distributions computed in the step 508 and the width difference between the y-direction projection distributions computed at the step 509 are both small, it is determined in the step 511 that there is a vapor leakage, so long as at least one of the shape factors of the picture memories 2 and 3 computed in the step 506 or 507 refers substantially to a circle in the step 510. If neither of the shape factors does not refers substantially to a circle, then it is determined in a step 512 that the abnormality refers to such a moving object as a person.

When the abnormality content judger 500 determines the presence of an abnormality, the abnormality informer 700 informs the operator of the abnormality in a form easily noticeable by the operator with use of abnormality data stored in the abnormality data memory 600. Shown in FIGS. 8, 9, 10 and 11 are examples of ways of informing the operator of the abnormality contents and its countermeasure to allow the operator to quickly cope with the situation.

Figure 8:
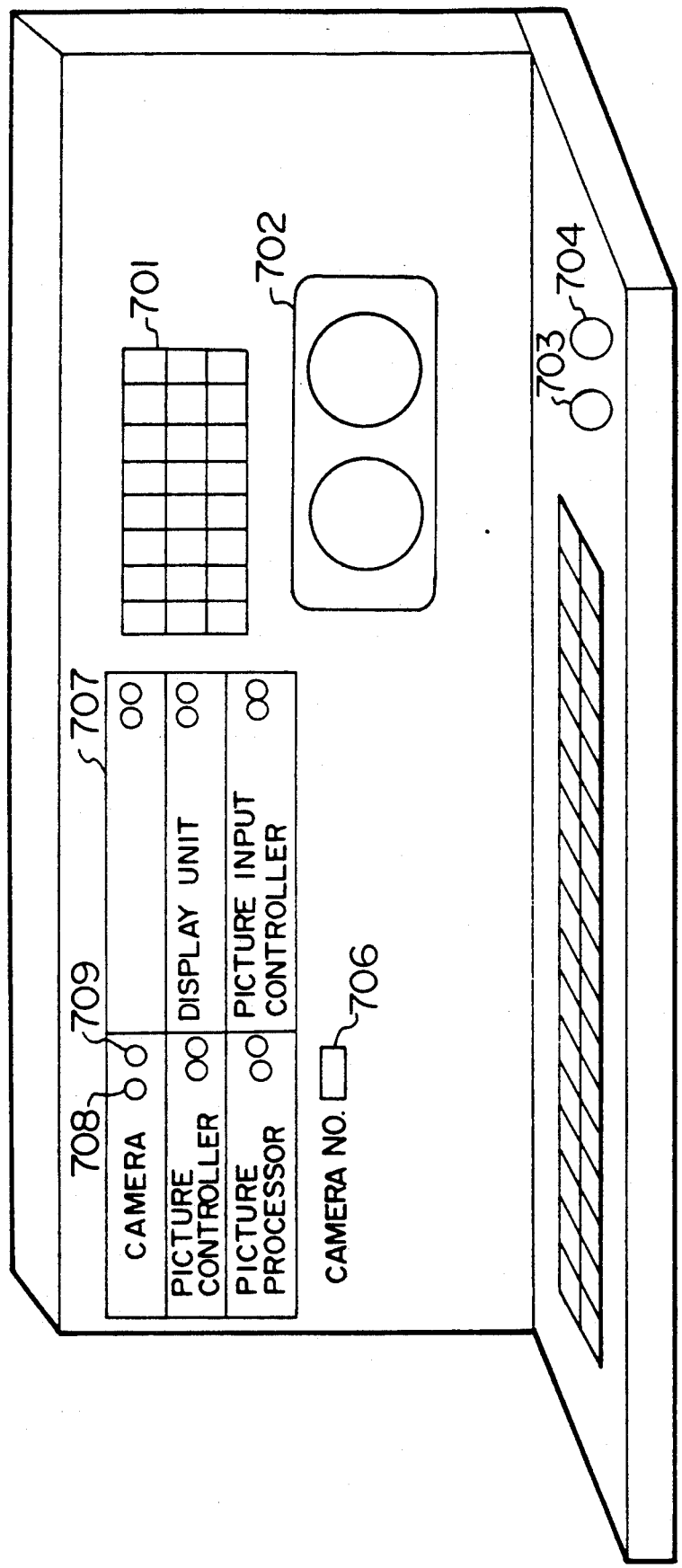
FIG. 8 shows an exemplary display of a central monitoring panel.

More concretely, FIG. 8 shows an example of how to display an abnormality on the central monitor panel installed in a central control room. In order for the operator to easily notice the occurrence of an abnormality in any of the devices provided at different plant locations, indicator lamps 701 corresponding to the scenes of the cameras are provided on the central monitor panel. Thus, if an abnormality takes place in any one of the devices, then a corresponding one of the indicator lamps 701 is immediately lighted up and a corresponding one of the abnormality scenes or contents of an abnormality previously stored in the abnormality data memory 600 is indicated on the display screen of such a display unit 702 as a monitor. When the operator wants to halt the automatic monitoring function, he pushes a push button 703 for screen selection to switch to the abnormal screen display and analyze the abnormal picture. If the operator wishes to return the abnormal display again to the automatic monitor display, then he pushes a change-over push button 704. In addition, indicator lamps 707 indicative of the faulty or normal state of the picture input device 10 (comprising cameras), picture input controller 100, picture processor 200, display units 800 and picture input device controller 50 are provided on the central monitor panel so that, when these monitoring devices are normal, blue lamps 08 corresponding thereto are illuminated, while, when these devices are abnormal or faulty, red lamps 709 corresponding thereto are illuminated to tell the operator the situations. Furthermore, since the cameras are uniquely denoted by respective identification numbers, one of the cameras are indicated at camera number indicators 706, respectively. As a result, the operator can clearly know the number of the faulty camera readily at first glance.

Figure 9:
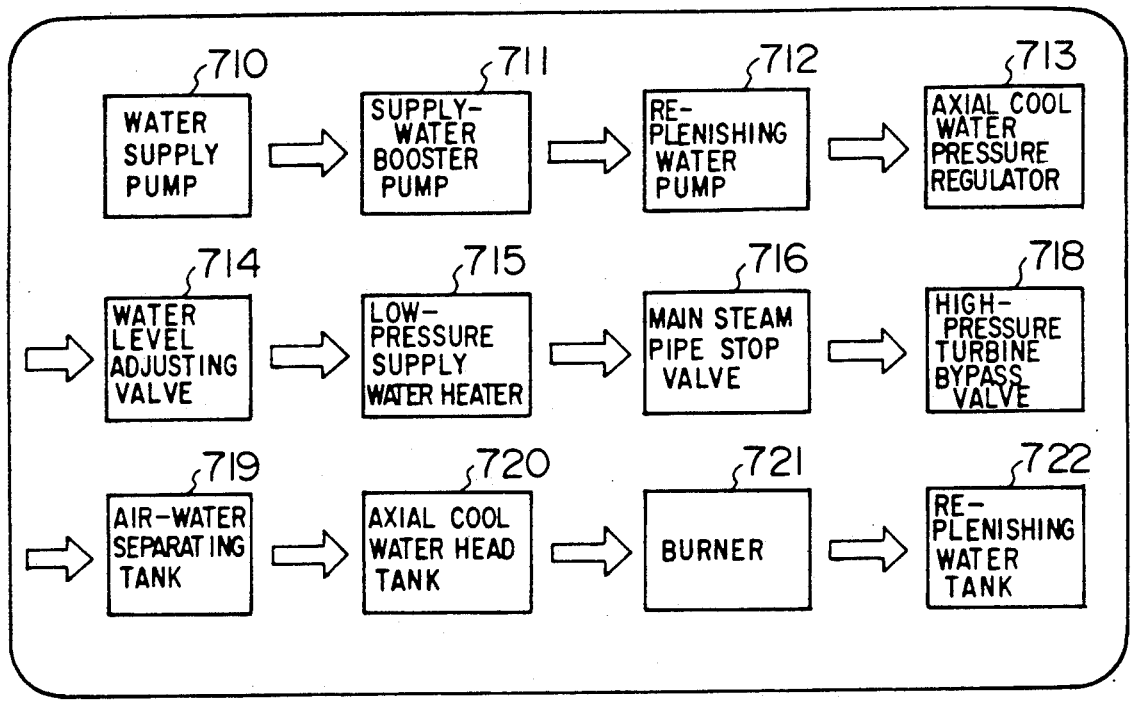
FIG. 9 is an exemplary display on a display unit showing a sequential patrol path as a guidance.

FIG. 9 is an example of the screen display of the display unit, showing how the operator inspects the abnormal device according to a sequential patrol route guidance indicated on the screen of the display unit. In the case where a water leakage takes place, as illustrated in FIG. 9, the inspection route starts from a water supply pump 710, goes through a supply-water booster pump 711, a replenishing water pump 712, an axial cool water pressure regulator 713, a water level adjusting valve 714, a low-pressure supply water heater 715, a main steam pipe stop valve 716, a high-pressure turbine bypass valve 718, an air-water separating tank 719, an axial cool water head tank 720 and a burner 721 sequentially, and ends in the replenishing water tank 722.

Figure 10:
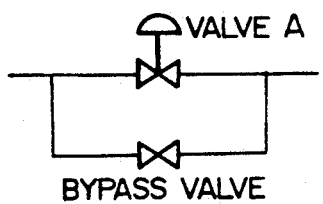
FIG. 10 is an exemplary display showing how the operator takes a countermeasure against an abnormality in a device according to the contents of the abnormality.

FIG. 10 is an example of a guidance display showing how the operator takes action against the occurrence of the abnormal device according to the contents of the abnormality. For example, when a water leakage occurs around a valve, the display unit indicates on its display screen of FIG. 10 a guidance statement 730 saying "A WATER LEAKAGE OCCURRED AROUND A VALVE A. CONFIRM THE SITUATION ON THE TV MONITOR AND CONTACT THE MAINTENANCE/REPAIR DEPARTMENT. WHEN CONTINUOUS OPERATION IS REQUIRED, OPEN THE BYPASS VALVE OF THE VALVE A", together with a schematic illustration.

Figure 11:
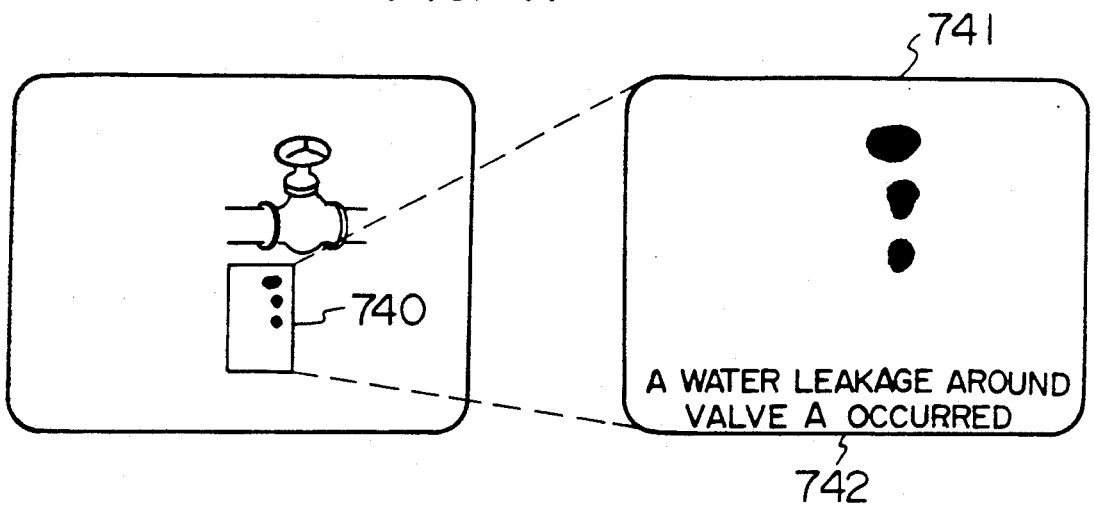
FIG. 11 shows a display on a monitor and its partially enlarged display.

FIG. 11 shows an exemplary enlarged display screen 741 of a restricted monitor area 740 of the picture displayed on the monitor provided in the central monitor room, together with a superimposed statement 742 including the name of the faulty device.

In addition to it, the name of the abnormal device and the details of the abnormality may be automatically vocally broadcast if necessary. In this case, the degree of the abnormality may be judged on the basis of the area computed at the abnormality detector 220 and the automatic broadcasting contents may be changed depending on the abnormality degree. For example, "VERY SMALL LEAKAGE" for the small area, "LEAKAGE INCREASING" for the gradually increasing area and "LARGE LEAKAGE" for the large area are vocally broadcast respectively. Further, such an imitation sound as "SHUUUU . . . " when a steam leakage is determined or such an imitation sound as "POTA, POTA, POTA . . . " when a water or oil leakage is determined may be issued to the central control room so that the maintenance operator can immediately recognize the type of the abnormality. Furthermore, it is possible to change the abnormality message or voice signal depending on a difference between a threshold value ($\alpha$) and an actually measured value (A). For example, when $A > 1.2\alpha$, the system is arranged so that the corresponding picture is displayed and the system informs the operator by means of such a message or voice that "CHECK THE PRESENCE OR ABSENCE OF ABNORMALITY": whereas, when $A < 0.8\alpha$, the system is arranged to provide no display. The above voice signal can be realized by using a voice synthesizer LSI. The area computed at the abnormality detector 220 may be displayed on the display unit in the form of a statistical chart such as a polygonal-line graph or a bar graph. As other means, it is possible to vibrate the operator's chair or issue a smell. That is, any means can be employed so long as it excites one or more the five senses of the operator.

Meanwhile, the aforementioned abnormality monitoring system itself may sometimes become faulty. FIG. 12 is a block diagram showing the interior of the monitor-device fault detector 900. In the drawing, a picture-input-device fault detector 910, when receiving no signal from the picture input device 10, judges that the picture input device 10 is faulty, supplies a signal indicative of the faulty picture input device 10 to the monitor-device fault informer 950, and instructs a switch 1001 to change its state. The switch 1001, when receiving the instruction, functions to switch the faulty picture input device 10 to the other normal picture input device 11 previously provided as one of the double picture input devices. A picture-controller fault detector 920, when the picture received from the picture input controller 100 is not changed even after passage of a predetermined time period, judges that the picture input controller 100 is faulty, supplies a faulty signal to the monitor-device fault informer 950, and instructs a switch 1002 to change its state. The switch 1002, when receiving the instruction, functions to switch operation from the current faulty picture input controller 100 to the other normal picture input controller 101 similarly provided as one of the double picture input controllers. In this connection, the predetermined time period is set to be larger than a time necessary for monitoring one location. A picture-processor fault detector 930 is provided to cause the picture processor 200 to execute a series of processings at constant intervals (but during a time period shifted from one scene to another) with use of a test pattern previously stored in the picture memory 240. When the processing result of the picture processor 200 does not refer to a predetermined computation value, the picture-processor fault detector 930 judges that the picture processor 200 is faulty, supplies a faulty signal to the monitor-device fault informer 950, and instructs a switch 1003 to change its state. The switch 1003, when receiving the instruction, functions to switch the faulty picture processor 200 to the other normal picture processor 201 similarly provided as one of the double picture processors. A display-unit fault detector 970, when the display unit 800 provides no display thereon, judges that the display unit 800 is faulty, and instructs a switch 1000 to change its state. The switch 1000, when receiving the instruction, functions to switch the current faulty display unit 800 to the other normal display unit 801 similarly provided as one of the double display units. A picture-input-device-controller fault detector 960, when the operator pushes the select push-button for the purpose of observing the abnormal picture but fails to change the current picture to the initial one, judges that the picture input device controller 150 is faulty, sends a faulty signal to the monitor-device fault informer 950, and instructs a switch 1005 to change its state. The switch 1005, when receiving the instruction, switches the operation from the current faulty picture input device controller 150 to the other normal picture input device controller 151 similarly provided as one of the double picture input device controllers. The picture-input-device-controller fault detector 960 also detects a positional shift between a template previously stored in the picture memory 240 (matching reference pattern) and a similar pattern of picture data of the picture input device 10 and when finding a positional shift exceeding a predetermined value, judges that the camera positioning part of the picture input device controller 150 is faulty, sends a faulty signal to the monitor-device fault informer 950, and instructs the switch 1005 to change its state. The switch 1005, when receiving the instruction, switches the current faulty picture input device controller 150 to the other normal picture input device controller 151 previously provided as one of the double picture input device controllers.

Figure 13:
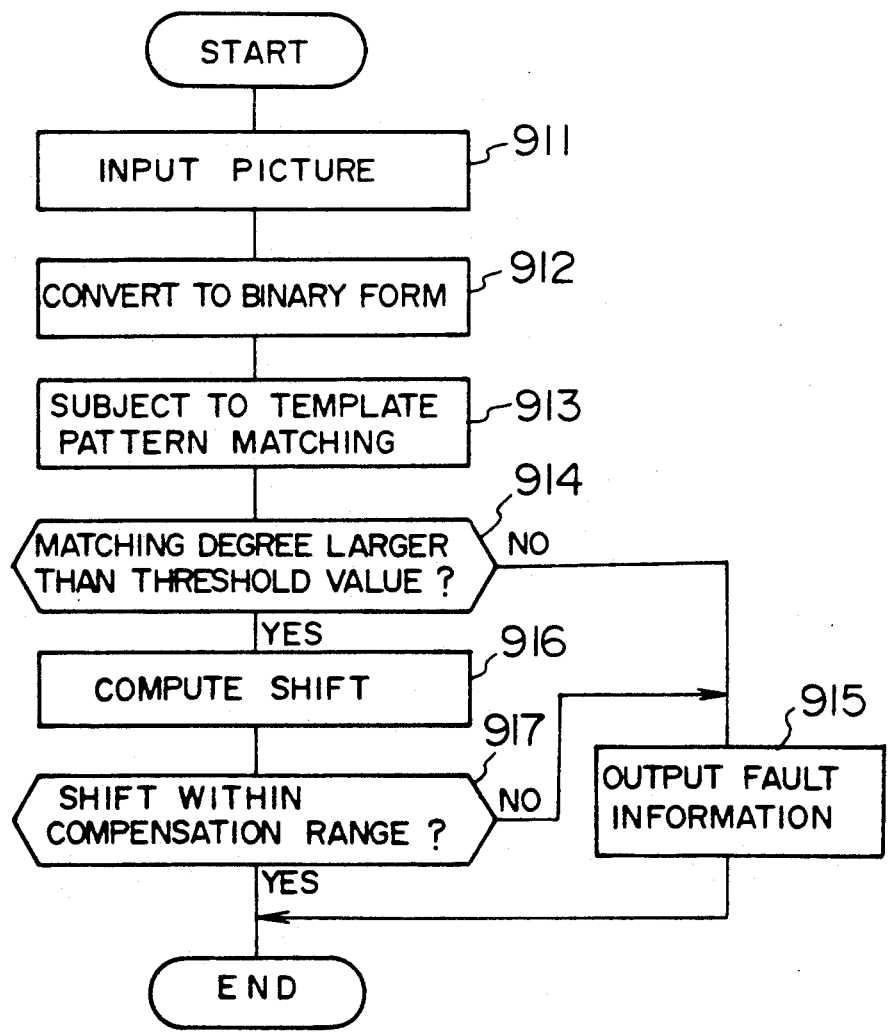
FIG. 13 is a flowchart for explaining a procedure on how a picture input device controller fault detector detects a fault in the camera positioning part.

FIG. 13 shows a procedure on how the picture-input-device-controller fault detector 960 detects a fault in the camera positioning part of the picture input device controller 150. More specifically, a picture to be monitored is inputted in a step 911 and then converted into a binary form in a step 912. The binary picture is subjected in a step 913 to a template pattern matching with a template pattern previously stored in the picture memory 240 to find a matching degree therebetween. It is judged in a step 914 whether or not the matching degree is larger than a threshold value. If the matching degree is smaller than the threshold value, i.e., if there is no similar pattern, then the picture-input-device controller fault detector 960 sends, in a step 915, indicative of the faulty camera positioning part of the picture input device controller 150 to the monitor-device fault informer 950. If the matching degree is larger than the threshold value, i.e., if there is a similar pattern, then a shift therebetween is calculated in a step 916. When it is determined in a step 917 that the calculated shift is out of a compensation range of the picture input device 10, control goes to the step 915 where the picture-input-device controller fault detector 960 outputs to the monitor-device fault informer 950 a signal indicative of the faulty camera positioning part of the picture input device controller 150.

Explanation will next be made as to how to correct a positional shift between the reference and input pictures which forms one of the features of the present invention.

Figure 14:
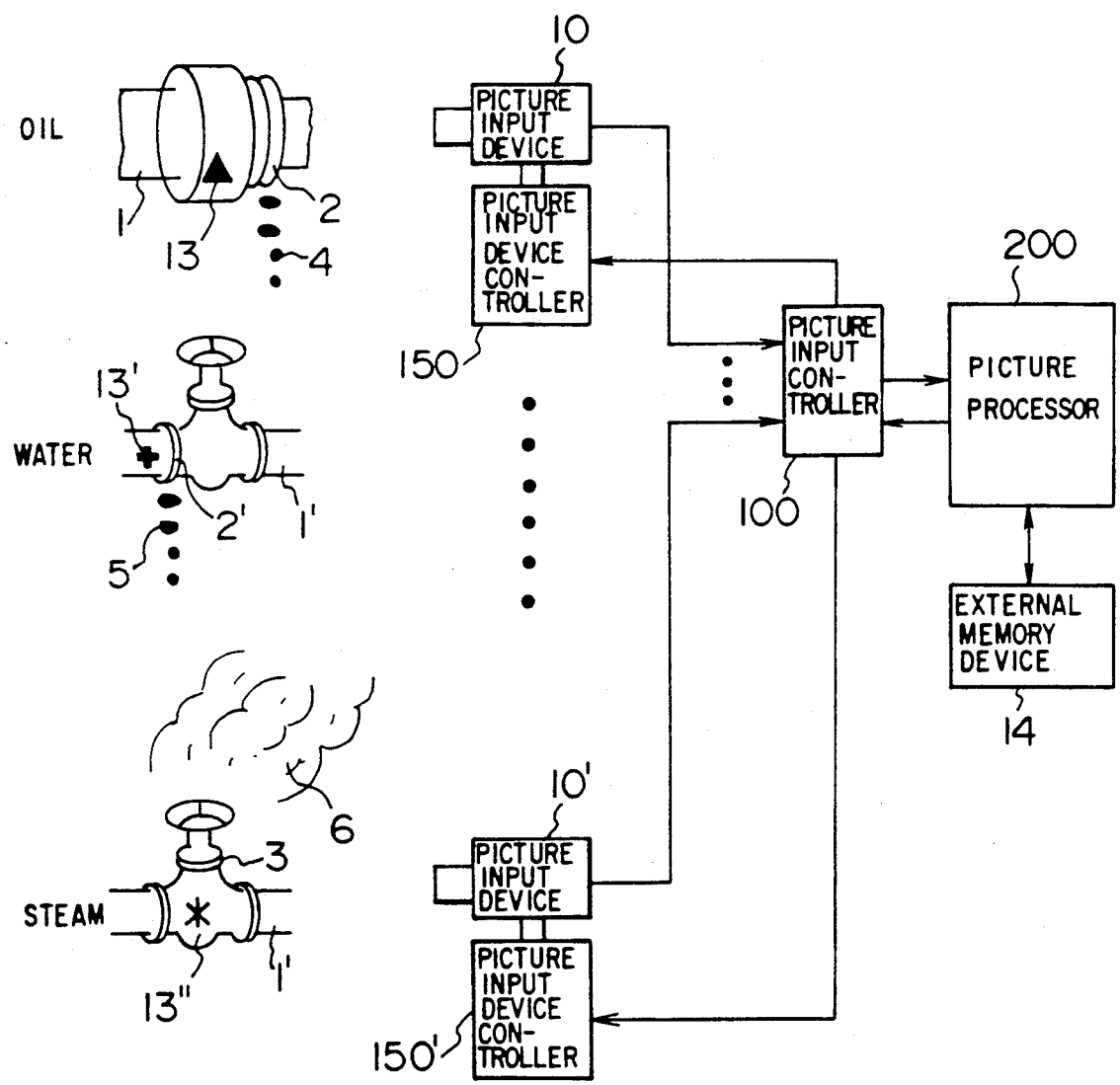
FIG. 14 is a diagram for explaining marks to be used in shift correction.

Referring to FIG. 14, there is shown an example of the arrangement of the present invention, wherein flanges 2 and 2' and a valve 3 to be monitored are provided in wiring pipes 1, 1' and 1", picture input devices such as ITV cameras 10 and 10' pick up pictures of the states of these flanges and valve with oil 4, water 5 and steam 6 being leaked and send these pictures through the picture input controller 100 to the picture processor 200 (refer to FIG. 1). In the drawing, reference symbols 13, 13' and 13" denote marks attached onto the wiring pipes 1, 1' and 1" and 150 and 150' denote picture input device controllers for controlling the position, attitude, diaphragm, etc. of the picture input controller 10 and 10'.

Figure 15:
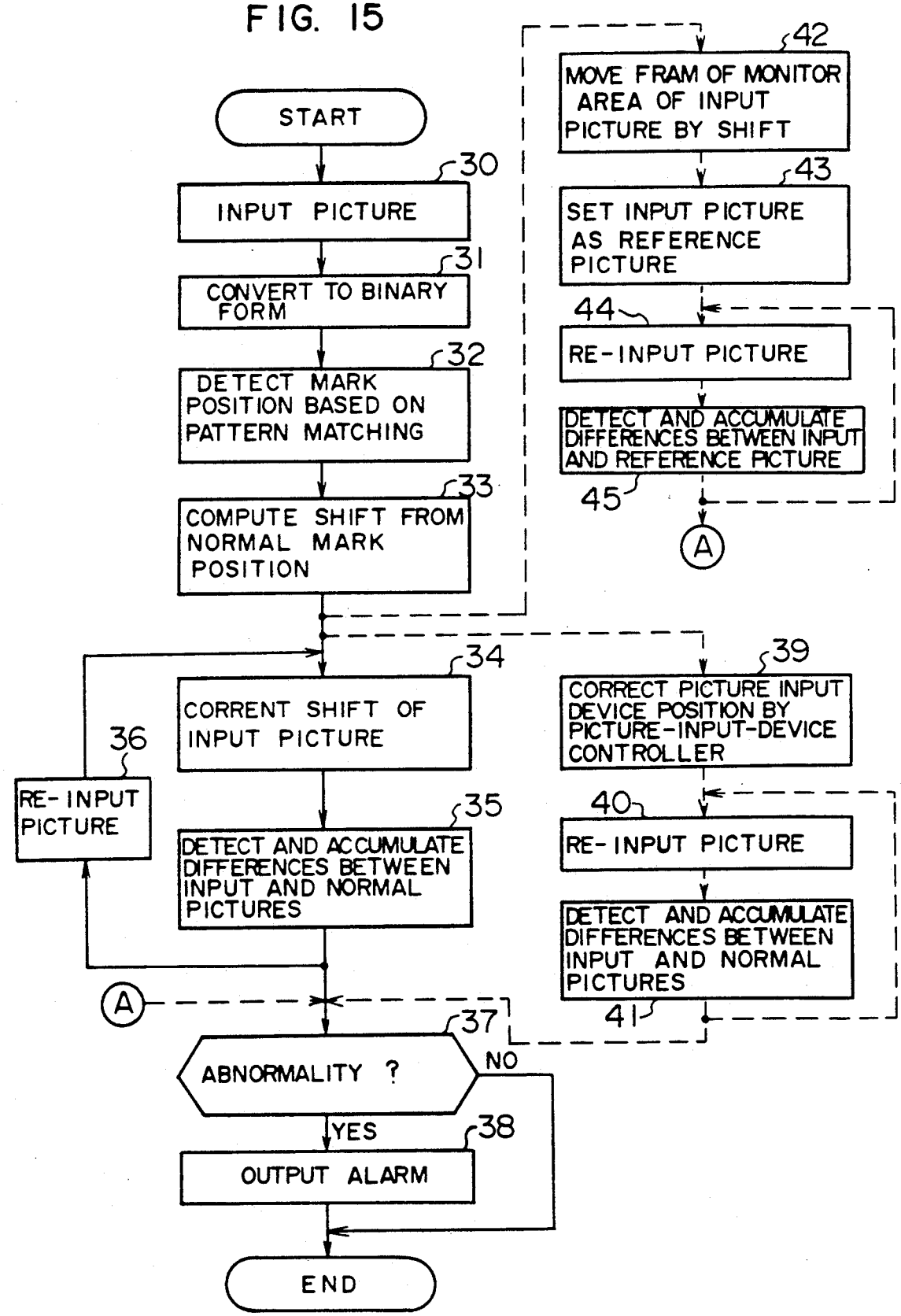
FIG. 15 is a flowchart for explaining the shift correction.

Next, a first shift correcting method carried out in the picture processor 200 will be explained with reference to a flowchart of FIG. 15. In the flowchart, pictures including the marks 13, 13' and 13" applied on the wiring pipes 1, 1' and 1" as well as the leakage of the oil 4, water 5 and steam 6 as abnormal phenomena are inputted through the picture input devices 10 and 10' (step 30). The inputted pictures are converted into binary forms and then the marks 13, 13' and 13" are extracted (step 31). The marks 13, 13, and 13" are subjected in the picture processor 200 to a pattern matching with respect to templates of the marks 13, 13' and 13" previously registered in the picture processor 200 or external memory device 14 to detect coordinates at which the highest matching degree is attained with the templates (step 32). Similarly, shift amounts ($\Delta x$, $\Delta y$) are calculated by referring to the coordinates of the normal positions of the marks previously stored in the picture processor 200 or external memory device 14 (step 33). In order to correct the shifts ($\Delta x$, $\Delta y$) the input picture is shifted by amounts ($-\Delta x$, $-\Delta y$) (step 34). The absolute values of differences in picture element brightness between the shifted input picture and normal picture are detected and accumulated (step 35). Thereafter, the next picture is again inputted (step 36). A loop of the step 34 to 36 is repeated n times to accumulate the absolute values of the brightness differences between the input and normal pictures to obtain an accumulated value. Then it is judged whether or not the accumulated value is larger than a threshold value to determine the presence or absence of an abnormality (step 37). In the absence of an abnormality, the picture processor 200 terminates its processing; whereas, in the presence of an abnormality, then the input picture is displayed on the screen of the display unit 800 and at the same time an alarm is issued (step 38).

Next, a second shift correcting method carried out in the picture processor 200 will be explained. In the second method, a shift between an input monitor picture zone and a normal monitor picture zone is corrected by moving the picture input device 10. More specifically, as shown in the right side of the flowchart of FIG. 15, a signal corresponding to the shift correction ($-\Delta x$, $-\Delta y$) is sent from the picture processor 200 through the picture input controller 100 to the picture input device controllers 150 and 150' to correct the positions of the picture input devices 10 and 10' by means of a step motor or the like (step 39). When the shift cannot be set within a certain error range through one correcting operation of the picture input device controller 15, a loop of the steps 30 to 39 is repeated, thereafter, the picture is again inputted (step 40) and the absolute values of differences in picture element brightness between the input picture and a normal picture previously stored are detected and accumulated (step 41) to obtain an accumulated value. The steps 40 and 41 are repeated n times to obtain the accumulated value and then control proceeds to the step 37.

Although the normal picture has been previously stored in the picture processor 200 or external memory device 14 in the foregoing explanation, the input picture used in the first loop of the steps 34, 35 and 36 or of the steps 40 and 41 may be employed as its normal picture. In the latter case, a simple floppy disk may be sufficient for the external memory device.

Figure 16:
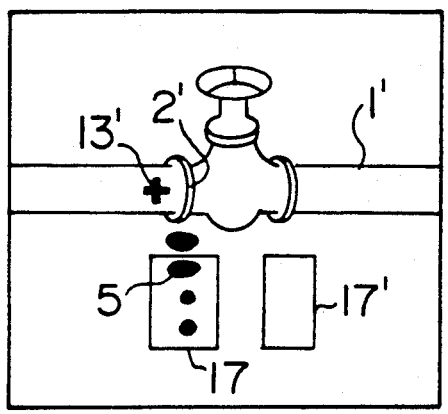
FIG. 16 is a diagram showing a monitor area (window)

A third shift correcting method carried out in the picture processor will be explained in conjunction with FIG. 16. In the drawing, in order to avoid any influence of the vibration of a camera or such an object to be monitored as the wiring pipe 1', monitor areas (windows) 17 and 17' are previously set in a monitor picture zone where such an abnormality as the water leakage 5 may occur with high possibility, and the frames of the monitor areas 17 and 17' are moved by an amount corresponding to the shift of the input picture. That is, in the third method, not the picture data within the areas 17 and 17' but only the positions of the areas are moved (refer to step 42 in the flowchart of FIG. 15). According to the third method, more in detail, as shown in the upper right side of FIG. 15, an input picture is stored in the picture processor 200 as a reference picture (step 43) and thereafter the picture is again inputted (step 44) and the absolute values of differences in picture element brightness between the reference picture and only the monitor areas 17 and 17' of the input picture are detected and accumulated (step 45). The steps 44 and 45 are repeated n times to obtain an accumulated value and then control goes to the step 37.

The foregoing embodiment can be applied to cases in which (1) a picture input device such as an ITV camera is fixedly mounted to monitor a single location, (2) a single ITV camera is fixedly mounted so that the rotating or moving up and down operation of the camera enables the single camera to monitor a plurality of locations, and (3) a single ITV camera in mounted on a robot carried on a rail movably along the rail to monitor a plurality of locations. In the case where a distance between the ITV camera and monitor zone is not changed and previously fixed, it can be considered that a shift between the normal and input monitor picture zone occurs two-dimensionally, that is, only in the x-axis and y-axis directions. In the event that the monitoring ITV camera is mounted on the robot running freely to a certain degree, however, a relative positional shift between the monitor object and the robot causes the shift between the normal and input monitor picture zones to also occur even in a depth direction (z-axis direction) and thus the shift must be corrected. A method of correcting the shift in the latter case will be detailed by referring to a flowchart of FIG. 17, wherein steps 50 to 55 are to be put between the steps 30 and 31 in FIG. 15. More in detail, in FIG. 17, the input picture inputted in the step 30 is converted into a binary form and the marks 13, 13' and 13" are extracted therefrom (step 50), and the areas, vertical and horizontal lengths, etc. of the marks 13, 13' and 13" are detected as features of the marks (step 51). A shift ($\Delta z$) in the depth direction is computed from area and length ratios between both of the input and normal marks with use of these features and the areas, vertical and horizontal lengths of the previously-stored normal marks 13, 13' and 13" (step 52). In this case, the shift correction in the depth direction based on picture conversion is carried out by enlarging or reducing the input picture (affine transformation) with use of the aforementioned area and length ratios (step 53). In the case of the correction based on the picture input device controllers 150 and 150', as in the two-dimensional correction, a signal corresponding to a shift correction ($-\Delta z$) is sent from the picture processor 200 to the picture input device controllers 150 and 150' to correct the positions of the picture input devices 10 and 10' by means of a step motor or the like of the controllers 150 and 150' (step 54). Thereafter, the picture is again inputted (step 55) and control proceeds to the step 31. When the shift cannot be set within a certain error range through one correcting operation of the picture input device controller 150, the steps 50 and 55 are repeated.

Figure 17:
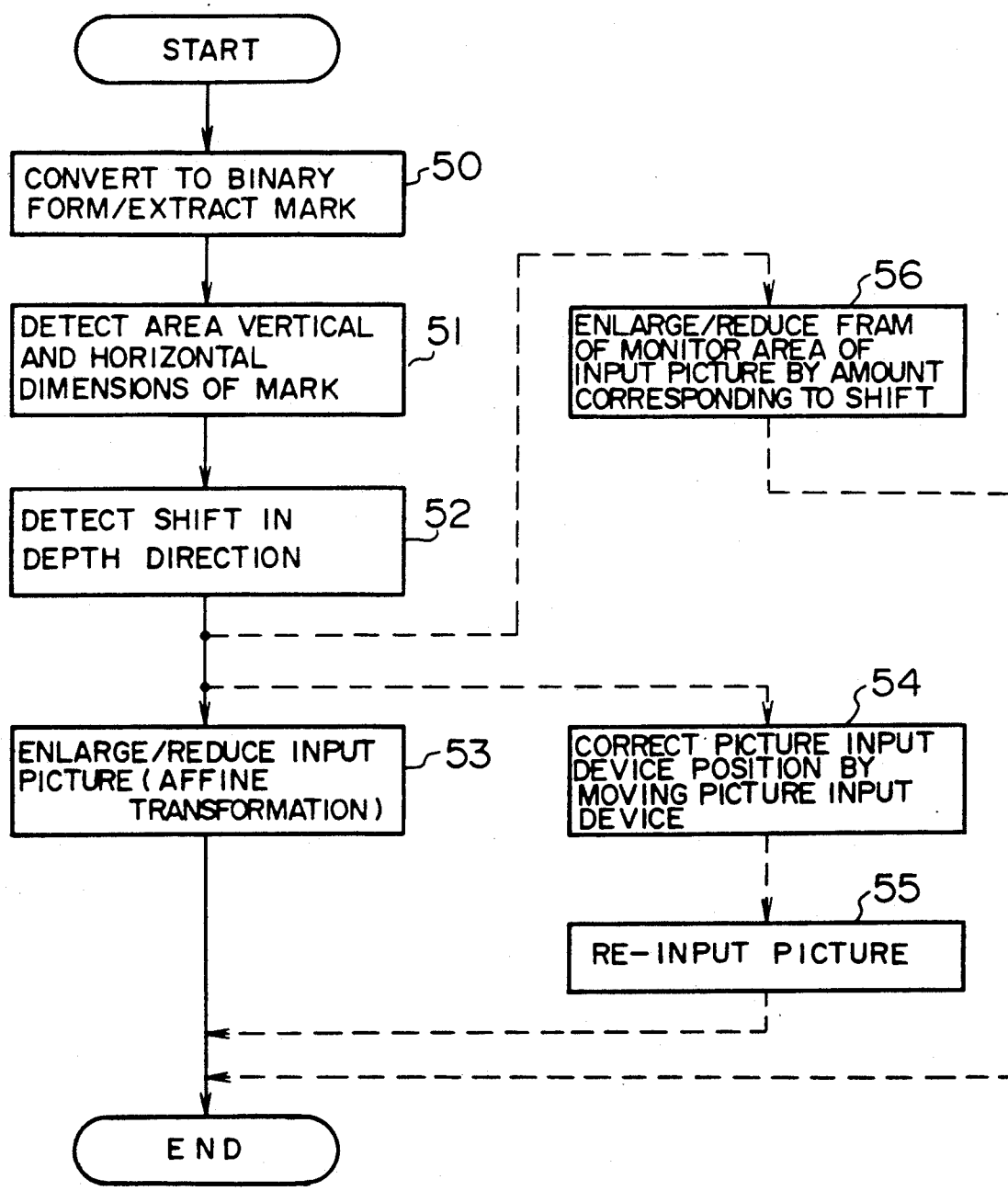
FIG. 17 is a flowchart for explaining a shift correction in a depth direction.

In the case where the monitor areas 17 and 17' are set in the monitor picture to process only the zones as mentioned above, the depth-direction shift correction is carried out by enlarging or reducing the frames of the monitor areas of the input picture by an amount corresponding to the shift after the processing of the step 52 as shown in FIG. 17 (step 56). After this, the steps 31, 32, 33, 42 and 43 in FIG. 15 are processed, the steps 44 and 45 are repeated n times, and the step 37 and 38 are processed.

Figure 18A:
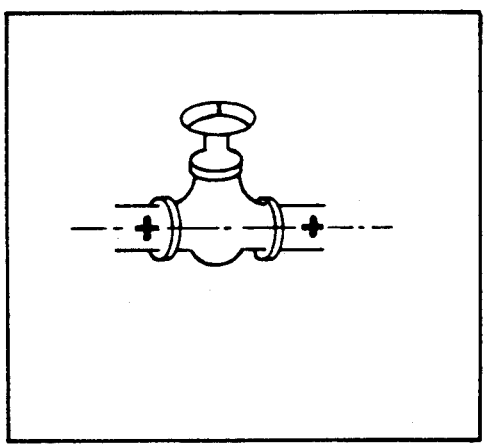
FIGS. 18A and 18B are diagrams for explaining a rotary shift correction respectively.
Figure 18B:
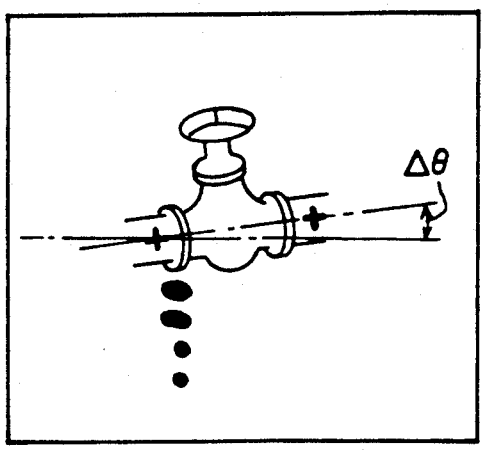

The foregoing explanation has been made as to the correction of the relative positional shift between the camera and monitoring object, but correction of a relative rotational shift can be realized in substantially the same manner as described above. This relative rotational shift correction can be carried out, for example, by applying two marks  to an object to be monitored, computing a gradient of a straight line connecting the two marks, computing a rotary shift ($\Delta \theta$) from the computed gradient, and then rotating the input picture by a shift correction ($-\Delta \theta$) as shown in FIGS. 18A and 18B. FIG. 18A shows a normal picture while FIG. 18B shows the input picture.

The foregoing describes the correction of a positional shift caused by the rotating or moving up and down operation of the camera or the like. In addition, the camera and object to be monitored are vibrated under the influence of the start and stop of a plant or a rotary machine. In spite of the fact that any abnormal condition (such as water leakage, oil leakage, etc., does not occur, the vibration causes a shift between a normal or reference monitor picture zone and an input monitor picture zone, whereby the contour part of the object to be monitored appears in a subtracted picture in the form of much noise, which disadvantageously makes it difficult to distinguish between the normal and abnormal conditions. In order to cope with this disadvantage, it is necessary to calculate a relative shift between the monitoring object and camera caused by the vibration for each input picture and to correct the relative vibration shift. This method will be explained by referring to FIG. 19.

The steps 30 to 35 and 39 in FIG. 19 are the same as the steps 30 to 35 and 39 in FIG. 15 and in order to again get the picture of the same scene, when the camera is returned to its original position, the positional shift caused by the rotating or moving up and down operation of the camera is corrected. Thereafter, the picture is again inputted (step 60) and converted into a binary form and a binary mark is extracted therefrom (step 61), the position of the mark is detected through a pattern matching operation or the like (step 62), a shift ($\Delta x, \Delta y$) between the normal and input monitor picture zones under the influence of the vibration of the monitor object is detected (step 63), the input picture is shifted by an amount ($-\Delta x, -\Delta y$) to correct the shift of the input picture (step 64), and the absolute values of differences in picture element brightness between the corrected picture and normal picture are calculated and accumulated (step 65). Then the steps 60 to 65 are repeated n times to accumulate the absolute values of the differences and obtain an accumulated value. It is judged whether or not the accumulated value is larger than a threshold value, i.e., the presence or absence of an abnormality (step 66). In the case where no abnormality is determined in the step 66, the picture processor 200 terminates its processing without executing any processing; whereas, in the case where an abnormality is determined in the step 66, the picture processor causes the then input picture to be displayed on the display unit 800 and also causes an alarm to be issued (step 67). The correction of the vibration shift has the advantage of being able to eliminate the need for previously setting such monitor areas 17 and 17' as shown in FIG. 16.

Though explanation has been made in connection with the case where the mark or marks are attached to the object to be monitored in the foregoing embodiment, it is also possible to correct the positional shift not by using any marks but by utilizing such an object to be monitored as a wiring pipe or the peripheral shape or contour of the monitor object. Even in the latter case, such a characteristic part as the wiring pipe can be previously registered as a template so as to be used for the positional shift correction through the pattern matching operation. In this case, however, in order to provide a clear shape of an object, this involves somewhat complicated contour emphasis processing and noise elimination processing.

Further, when different marks such as ✚, ▲ and * are applied to different types (water leakage, oil leakage, steam leakage, etc.) of the abnormality for the monitor object, the type of the detected abnormality can be known on the basis of the shape of the extracted mark. Accordingly, more accurate detection of the contents of the abnormality can be realized. Since ease in the detection of the mark is determined by the color or density of the mark, the mark to be used is required to have a high contrast with the background of the mark such as the monitor object to which the mark is attached.

Figure 20A:
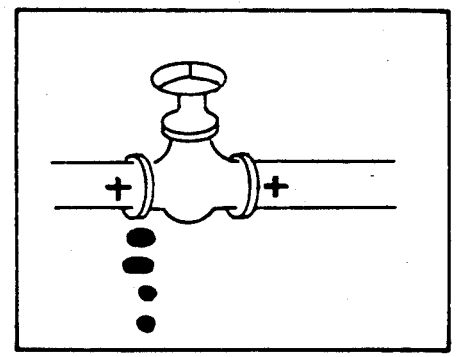
FIGS. 20A and 20B are diagrams for explaining how to use a plurality of marks.
Figure 20B:
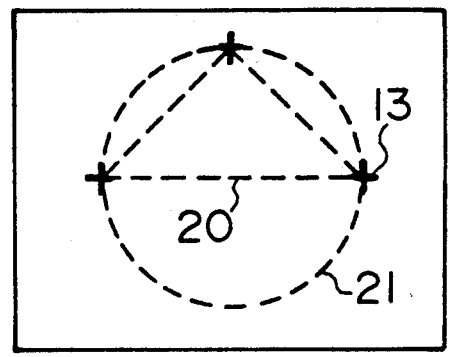

With respect to the mark, in addition, the shape of the mark is required to be selected other than the shapes of the monitor object and its surroundings. For example, for the purpose of avoiding any misdetection, such a mark as a tiger-stripe pattern is unsuitable. Such a mark that comprises a medium emitting light (for example, a mark coated with fluorescent material) is considered. In this case, even when the monitoring environment lacks in illumination, the mark can be reliably detected. When not a single mark but a plurality of marks are used (refer to FIGS. 20A and 20B) to detect a positional shift, the detection accuracy of the positional shift can be higher than that in the use of the single mark, since the center point of the plurality of marks can be used to accurately detect the positional shift. In the case where a plurality of marks are used, a zone to be monitored can be set to be such a zone as enclosed by the plurality of marks (a zone 20 enclosed by straight lines connecting the marks or a zone 21 enclosed by a circle passing through the marks) as shown in FIG. 20B.

In accordance with the present embodiment, the positional shift can be detected easily and accurately by applying a mark or marks to the vicinity of an object to be monitored. As a result, the noise caused by a shift between normal and input monitor picture zones can be suppressed and the presence or absence of an abnormality can be rightly determined.

What is claimed is:

1. An abnormality monitoring system comprising:
   a) picture input means for inputting a plurality of monitor pictures from objects to be monitored;
   b) picture input controlling means for periodically selecting a monitor picture from said inputted monitor pictures in accordance with at least one of a degree of importance for monitoring and a danger level of said objects to be monitored, so that monitor pictures having higher degrees of importance or higher danger levels are selected more frequently;
   c) abnormality detecting means for detecting an abnormality by comparing each selected monitor picture with a reference picture;
   d) abnormality content judging means for judging contents of said abnormality on the basis of an output of said abnormality detecting means; and
   e) abnormality indicating means for indicating said abnormality.

2. An abnormality monitoring system as set forth in claim 1, wherein said picture input controlling means includes a table showing relations between scenes monitored by said picture input means and danger levels indicative of degrees of importance in association with said scenes and selection designating means for controlling selection of said scenes on the basis of values of said danger levels.

3. An abnormality monitoring system as set forth in claim 2, wherein said table includes initial danger levels and current danger levels, said selection designating means includes means for determining values of said current danger levels on the basis of values of said initial danger levels and means for controlling selection of said scenes on the basis of said values of the current danger levels.

4. An abnormality monitoring system as set forth in claim 1, wherein said picture input controlling means includes means for changing frequency of selection of said monitor picture in response to said operating condition of said device to be monitored.

5. An abnormality monitoring system comprising:
   a) picture input means for inputting a plurality of monitor picture from an object to be monitored;
   b) picture input controlling means for selecting a monitor picture in response to an operating condition or degree of importance of monitoring or danger level of said object to be monitored;

c) abnormality detecting means for detecting an abnormality by comparing said monitor picture with a reference picture;
d) abnormality content judging means for judging contents of said abnormality on the basis of an output of said abnormality detecting means; and
e) abnormality indicating means for indicating said abnormality;

wherein said abnormality detecting means includes means for computing differences in picture element brightness between a first abnormality-detected picture and a said reference picture to obtain a first subtracted picture and means for computing differences in picture element brightness between a last abnormality detected picture and said reference picture to obtain a second subtracted picture, and wherein said abnormality content judging means includes means for computing projection distributions of brightness of said first subtracted picture in X and Y directions, means for computing projection distributions of brightness of said second subtracted picture in the X and Y directions, means for computing a width difference between said X-direction projection distributions of said first and second subtracted pictures, means for computing a width difference between said Y-direction projection distributions of said first and second subtracted pictures, and means for judging contents of abnormality by comparing said X-direction width difference and said Y-direction width difference with respective predetermined values separately set.

6. An abnormality monitoring system as set forth in claim 5, wherein said abnormality content judging means includes means for computing a shape factor of said first subtracted picture, means for computing a shape factor of said second subtracted picture, and means for judging contents of an abnormality on the basis of said shape factors.

7. An abnormality monitoring system as set forth in claim 1, wherein said abnormality indicating means includes means for displaying details of processing involving said abnormality.

8. An abnormality monitoring system as set forth in claim 1, wherein said abnormality indicating means includes means for audibly indicating said abnormality identification.

9. An abnormality monitoring system as set forth in claim 1, wherein said abnormality indicating means includes means for indicating of said abnormality identification in the form of a simulated sound.

10. An abnormality monitoring system as set forth in claim 1, wherein at least said picture input means, said picture input controlling means, said abnormality detecting means and said indicating means have respectively a counterpart means for performing respectively corresponding function.

11. An abnormality monitoring system comprising:
a) picture input means for inputting a monitor picture from an object to be monitored;
b) controlling means for controlling positions of said picture input means;
c) means for previously storing therein a reference picture of a normal state as well as pictures of identification marks attached onto objects to be monitored as matching reference patterns for matching between said reference picture and said monitor picture in a monitor state;
d) means for computing a shift between the both pictures by comparing mark positions of said reference picture with mark positions of said monitor picture; and
e) means for correcting said monitor picture on the basis of the result of said computation.

12. An abnormality monitoring system as set forth in claim 11, wherein said correcting means includes means for correcting said shift by applying an affine transformation, including at least one of movement, enlargement, reduction and rotation, to said monitor picture.

13. An abnormality monitoring system as set forth in claim 11, wherein said correcting means includes means for correcting said shift by applying an affine transformation, including at least one of movement, enlargement, reduction and rotation, to a frame of a monitor area (window) in said monitor picture.

14. An abnormality monitoring system as set forth in claim 11, wherein said correcting means includes means for correcting said shift by moving said picture input means by means of said controlling means.

15. An abnormality monitoring system as set forth in claim 12, wherein said correcting means further includes means for computing a vibration shift caused by relative vibration between said objects to be monitored and said picture input means and means for correcting said vibration shift by applying said affine transformation, including at least one of movement, enlargement, reduction and rotation, to said monitor picture until said vibration shift becomes smaller than a predetermined value.

16. An abnormality monitoring system as set forth in claim 14, wherein said correcting means further includes means for computing a vibration shift caused by relative vibration between said objects to be monitored and the picture input means and means for correcting said vibration shift by applying an affine transformation, including at least one of movement, enlargement, reduction and rotation, to said monitor picture until said vibration shift becomes smaller than a predetermined value.

17. An abnormality monitoring system comprising:
a) picture input means for inputting a monitor picture from an object to be monitored;
b) controlling means for controlling positions of said picture input means;
c) means for previously storing therein a reference picture of a normal condition as well as pictures of identification marks attached onto objects to be monitored as matching reference patterns for matching between said reference picture and said monitor picture in a monitor state;
d) means for computing a shift between the both pictures by comparing mark positions of said reference picture with mark positions of said monitor picture; and
e) means for correcting said monitor picture on the basis of the result of said computation;
wherein said identification marks are made different from each other in shape depending on types of abnormality to be predicted.

18. An abnormality monitoring system as set forth in claim 11, wherein each of said identification marks has a color providing a sufficiently high contrast with background of said object to be monitored on which the mark is to be attached.

19. An abnormality monitoring system comprising:

a) picture input means for inputting a monitor picture from an object to be monitored;

b) controlling means for controlling positions of said picture input means;

c) means for previously storing therein a reference picture of a normal condition as well as pictures of identification marks attached onto objects to be monitored as matching reference patterns for matching between said reference picture and said monitor picture in a monitor state;

d) means for computing a shift between the both pictures by comparing mark positions of said reference picture with mark positions of said monitor picture; and e) means for correcting said monitor picture on the basis of the result of said computation;

wherein each of said identification marks has a unique shape other than shapes of said objects to be monitored and its ambient objects.

20. An abnormality monitoring system as set forth in claim 11, wherein said identification marks include fluorescent material.

21. An abnormality monitoring system comprising:

a) picture input means for inputting a monitor picture from an object to be monitored;

b) controlling means for controlling positions of said picture input means;

c) means for previously storing therein a reference picture of a normal condition as well as pictures of identification marks attached onto objects to be monitored as matching reference patterns for matching between said reference picture and said monitor picture in a monitor state;

d) means for computing a shift between the both pictures by comparing mark positions of said reference picture with mark positions of said monitor picture; and e) means for correcting said monitor picture on the basis of the result of said computation;

wherein a monitor area of said monitor picture is a zone enclosed by a plurality of said identification marks attached onto said object to be monitored.

* * * * *